*(12)* United States Patent
Martin et al.

(10) Patent No.: US 9,523,198 B2
(45) Date of Patent: *Dec. 20, 2016

(54) GYPSUM WALLBOARD AND METHOD OF MAKING SAME

(75) Inventors: William C. Martin, Plover, WI (US); Eli Stav, Charlotte, NC (US); Matthew J. Plante, Huntersville, NC (US); Maryn L. Heermann, Charlotte, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,885

(22) Filed: Aug. 11, 2011

(65) Prior Publication Data

US 2011/0293916 A1    Dec. 1, 2011

Related U.S. Application Data

(63) Continuation of application No. 12/139,866, filed on Jun. 16, 2008, now Pat. No. 8,016,961.

(60) Provisional application No. 60/944,093, filed on Jun. 14, 2007.

(51) Int. Cl.
| | |
|---|---|
| *B32B 5/20* | (2006.01) |
| *E04C 2/04* | (2006.01) |
| *B28B 19/00* | (2006.01) |
| *C04B 28/14* | (2006.01) |
| *B32B 38/00* | (2006.01) |
| *C04B 111/00* | (2006.01) |

(52) U.S. Cl.
CPC ........... *E04C 2/043* (2013.01); *B28B 19/0092* (2013.01); *C04B 28/14* (2013.01); *B32B 2038/0084* (2013.01); *B32B 2305/022* (2013.01); *B32B 2315/18* (2013.01); *B32B 2317/12* (2013.01); *B32B 2607/00* (2013.01); *C04B 2111/0062* (2013.01); *C04B 2111/00413* (2013.01); *Y02W 30/97* (2015.05); *Y10T 428/249932* (2015.04); *Y10T 428/249953* (2015.04)

(58) Field of Classification Search
CPC ....... E04C 2/043; B28B 19/0092; C04B 28/14
USPC .................. 156/39, 43; 428/294.7
See application file for complete search history.

(56) References Cited

U.S. PATENT DOCUMENTS

| | | |
|---|---|---|
| 4,057,443 A | 11/1977 | Stiling et al. |
| 5,151,130 A | 9/1992 | Croft et al. |
| 5,643,510 A | 7/1997 | Sucech |
| 5,962,119 A | 10/1999 | Chan |

(Continued)

FOREIGN PATENT DOCUMENTS

JP    63246212    10/1988

OTHER PUBLICATIONS

PCT/US2008/067100, International Searching Authority, PCT Search Report, dated Sep. 3, 2008.

(Continued)

*Primary Examiner* — Joseph Del Sole
*Assistant Examiner* — John Robitaille
(74) *Attorney, Agent, or Firm* — Ice Miller LLP

(57) ABSTRACT

A coalescing additive is used in the manufacturing process for gypsum wallboard. Such an additive increases the surface area and density of the slurry at the paper to core interface by coalescing the foam cells away from the paper core interface. This permits a stronger paper to core bond to form and increases the compressive strength of the gypsum wallboard as compared to standard wallboards made from slurries with reduced water levels.

17 Claims, 2 Drawing Sheets

(56) References Cited

U.S. PATENT DOCUMENTS

| | | |
|---|---|---|
| 2003/0010419 A1 | 1/2003 | Sethuraman |
| 2004/0028956 A1 | 2/2004 | Savoly et al. |
| 2004/0170873 A1 | 9/2004 | Smith |
| 2004/0231916 A1 | 11/2004 | Englert et al. |
| 2006/0278130 A1 | 12/2006 | Liu et al. |
| 2008/0009565 A1 | 1/2008 | Wittbold et al. |

OTHER PUBLICATIONS

PCT/US2008/067100, International Searching Authority, Written Opinion, dated Sep. 3, 2008.
U.S. Appl. No. 12/139,866, United States Patent and Trademark Office, Office Action, Dated Oct. 1, 2010.
European Patent Office, Supplementary European Search Report, Nov. 28, 2011.

GYPSUM WALLBOARD AND METHOD OF MAKING SAME

RELATED APPLICATIONS

This U.S. Utility Patent Application claims priority to and is a continuation application of U.S. Utility patent application Ser. No. 12/139,866, filed Jun. 16, 2008; which is related to and claims the priority benefit of U.S. Provisional Patent Application 60/944,093, filed on Jun. 14, 2007. The contents of each of these applications are hereby incorporated by reference in their entirety into this disclosure.

BACKGROUND

Conventional gypsum wallboard has been used for over fifty years in the construction of residential and commercial building interior walls and ceilings. Typically, wallboard consists essentially of a gypsum core sandwiched between and bonded to two sheets of facing material (e.g., paper) and is used as a cost-effective replacement of conventional plaster walls. To be commercially profitable, gypsum products, such as wallboard, are typically manufactured by continuous high speed processes. Typically, natural gypsum (calcium sulfate dihydrate) predominately makes up wallboard. Manufacturers mine and transport gypsum to a mill in order to dry it, crush/grind it and calcine it to yield stucco. The reaction for the calcination process is characterized by the following equation:

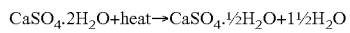

$$CaSO_4 \cdot 2H_2O + heat \rightarrow CaSO_4 \cdot \tfrac{1}{2}H_2O + 1\tfrac{1}{2}H_2O$$

This equation shows that calcium sulfate dihydrate plus heat yields calcium sulfate hemihydrate (stucco) plus water vapor. This process is conducted in a calciner, of which there are several types known in the art. The stucco can contain one of two forms of calcium sulfate hemihydrate: the α-hemihydrate form and the β-hemihydrate form. These two types of stucco are often produced by different means of calcination. While the β-hemihydrate form is normally used due to its lower cost, either type of calcium sulfate hemihydrate is suitable for use.

Calcined gypsum (stucco) has the valuable property of being chemically reactive with water, and will "set" rather quickly when the two are mixed together. This setting reaction reverses the above-described stucco chemical reaction performed during the calcination step. The reaction proceeds according to the following equation:

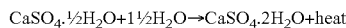

$$CaSO_4 \cdot \tfrac{1}{2}H_2O + 1\tfrac{1}{2}H_2O \rightarrow CaSO_4 \cdot 2H_2O + heat$$

In this reaction, the calcium sulfate hemihydrate is rehydrated to its dihydrate state over a fairly short period of time. The actual time required for this setting reaction generally depends upon the type of calciner employed and the type of gypsum rock that is used. The reaction time can be controlled to a certain extent by the use of additives such as accelerators and retarders.

In known manufacturing processes for gypsum wallboard, the setting reaction is facilitated by premixing dry and wet ingredients in a mixing apparatus, such as a pin mixer. The dry ingredients can include, but are not limited to, any combination of calcium sulfate hemihydrate (stucco), fiberglass, and accelerator, and in some cases natural polymer (i.e., starch). The wet ingredients can be made of many components, including but not limited to, a mixture of water, paper pulp, and potash (hereinafter, collectively referred to as a "pulp paper solution"). The pulp paper solution provides a significant portion of the water that forms the gypsum slurry of the core composition of the wallboard. The dry ingredients and the pulp solution contain the basic chemical components of a piece of wallboard.

Conventional methods of preparing gypsum wallboard are well known to those skilled in the art. For example, the dry ingredients and pulp paper solution can be mixed together in a pin mixer. In this manner, the dry ingredients and pulp paper solution create a fluid mixture or "slurry." The slurry is discharged from the mixer through the mixer's outlet chute or "boot" which spreads the slurry on a moving, continuous bottom facing material. A moving, continuous top facing material is placed on the slurry and the bottom facing material, so that the slurry is positioned in between the top and bottom facing materials to form the board. The board can then pass through a forming station which forms the wallboard to the desired thickness and width. The board then travels along a belt line for several minutes, during which time the rehydration reaction occurs and the board stiffens. The boards are then cut into a desired length and then fed into a large, continuous kiln for drying. During drying, the excess water (free water) is evaporated from the gypsum core while the chemically bound water is retained in the newly formed gypsum crystals.

While conventional gypsum wallboard products have many advantages, it has also long been desired to reduce the cost of manufacturing gypsum wallboard. One method of reducing the cost of manufacturing gypsum wallboard has been to reduce the amount of water used in the manufacturing of the wallboard. Reduction in water reduces the amount of free water left in the wallboard after the setting reaction. A lower amount of free water left in the wallboard results in less drying energy being expended to remove the free water, which in turn saves energy costs associated with drying wallboard (i.e., the fuel cost associated with operating a kiln to dry the wallboard). However, reducing water negatively impacts the manufacturing process by reducing the slurry fluidity, increasing board weight, adversely affecting the paper to core bond, and decreasing the compressive strength of the board.

To ensure that the slurry remains fluid and the weight of the board is not increased, gypsum wallboard is often produced by incorporating aqueous foam into the stucco slurry. The foam comprises foam cells (i.e., bubbles) that create air pockets in the gypsum core of the wallboard, as the slurry sets. Thus, the core density and the overall weight of the wallboard can be controlled by incorporating aqueous foam into the slurry. The foam usually is prepared using foam water, a foaming solution (i.e., soap), and air in any number of mechanical foam generation devices. As the amount of water used in the slurry decreases, the volume of aqueous foam is increased to maintain desired board weights and thickness. While foam can be used for these purposes, the use of aqueous foam has the detrimental effect of reducing the strength of the produced wallboard.

The increased level of foam produces an increased number of foam cells at the paper core interface. Wallboard gets its strength from the formation and the interlocking of crystals of calcium sulfate dihydrate that form during the rehydration process. At the paper core interface, these crystals of calcium sulfate dihydrate interlock with the fibers of the facing materials to form the paper to core bond. While "paper core interface" and "paper to core bond" is used throughout this disclosure, it is appreciated that any facing material can be used to sandwich the gypsum core. Thus, the term "paper core interface" will refer to the interface between the core and any facing material used and the term "paper to core bond" will refer to the bond formed between the core and any facing material used.

The presence of foam cells at the paper core interface causes a decrease in the strength of the paper to core bond, because the foam cells at the paper core interface prevent a uniform paper to core bond from forming. In addition, the stability of the foam solutions used leads to the production of randomly sized air voids which in turn results in the walls between the air voids being sized non-uniformly. The non-uniform size of the air voids and the walls between the air voids leads to a decrease in compressive strength for such gypsum wallboards that are produced using foams. Thus far, efforts to improve the paper to core bond and the compressive strength in such manufacturing processes have only increased the cost, and in some cases the time involved, in manufacturing gypsum wallboard.

For example, the addition of natural polymers, such as acid modified starches, is found to increase the strength of the paper to core bond. Starch gels during the drying of the wallboard and is carried to the paper core interface by the evaporating water. The presence of the gelled starch at the paper core interface causes a stronger bond between the facing material and the core to form. Such natural polymers are expensive and add cost in manufacturing gypsum wallboard.

Another alternative for strengthening the paper to core bond involves the use of additional steps that both increase the cost and time involved in producing wallboard. An example of such an alternative is sandwiching a low density gypsum slurry with foam between two thin layers of higher density gypsum slurry. This involves the added steps of depositing two layers of higher density gypsum slurry (one on the bottom facing material prior to the depositing of the lower density slurry and one on top of the lower density slurry prior to the placement of the top facing material on top of the slurry). The added steps both increase the cost and the time involved in manufacturing gypsum wallboard.

Other methods focus on soap and dispersant chemistries in order to create foaming solutions with a more uniform foam cell structure. The drawback of such chemistries is their effectiveness are largely dependent on the quality of the water that is used, which varies from plant to plant.

SUMMARY

Methods of manufacturing and compositions are provided for gypsum wallboard. For example, a method of manufacturing gypsum wallboard can comprise the steps of depositing a slurry, including stucco, paper pulp and water, on a facing material to create a paper to core bond at the paper to core interface; adding an aqueous foam to the slurry, thereby creating a plurality of foam cells in the slurry; and adding an additive to the slurry that coalesces the foam cells, thereby increasing the surface area and density of the slurry at the paper core interface. Further examples include a gypsum wallboard produced from such a method and a gypsum wallboard that comprises at least one facing material, a gypsum core bonded to the at least one facing material, and an additive and a plurality of foam cells in the gypsum core, wherein the foam cells are coalesced away from the at least one paper core interface and the density of the gypsum core at the at least one paper core interface is greater than the density of the gypsum core further away from the at least one paper core interface.

The additive can be a polyamine or chemistries based upon polydimethylsiloxane with aminoalkyl and polyether groups (emulsions in water). The additive can be added to a water source, such as the gauging water line, pulp water line or foam water line, so that the additive can be added to the slurry when such water is added to the slurry. The additive can also be added to the slurry through a conduit in the slurry discharge, when the slurry passes through the slurry discharge to be deposited on the facing material. The additive can be added to the slurry at a controlled rate. For example, the additive can be added to the slurry at about 0.15 to about 0.5 pounds per 1,000 square feet of slurry, at about 0.15 to about 0.18 pounds per 1,000 square feet of slurry for a ½ inch thick board, and at about 0.18 to about 0.35 pounds per 1,000 square feet of slurry for a ⅝ inch thick wallboard.

DETAILED DESCRIPTION

Figure 1:
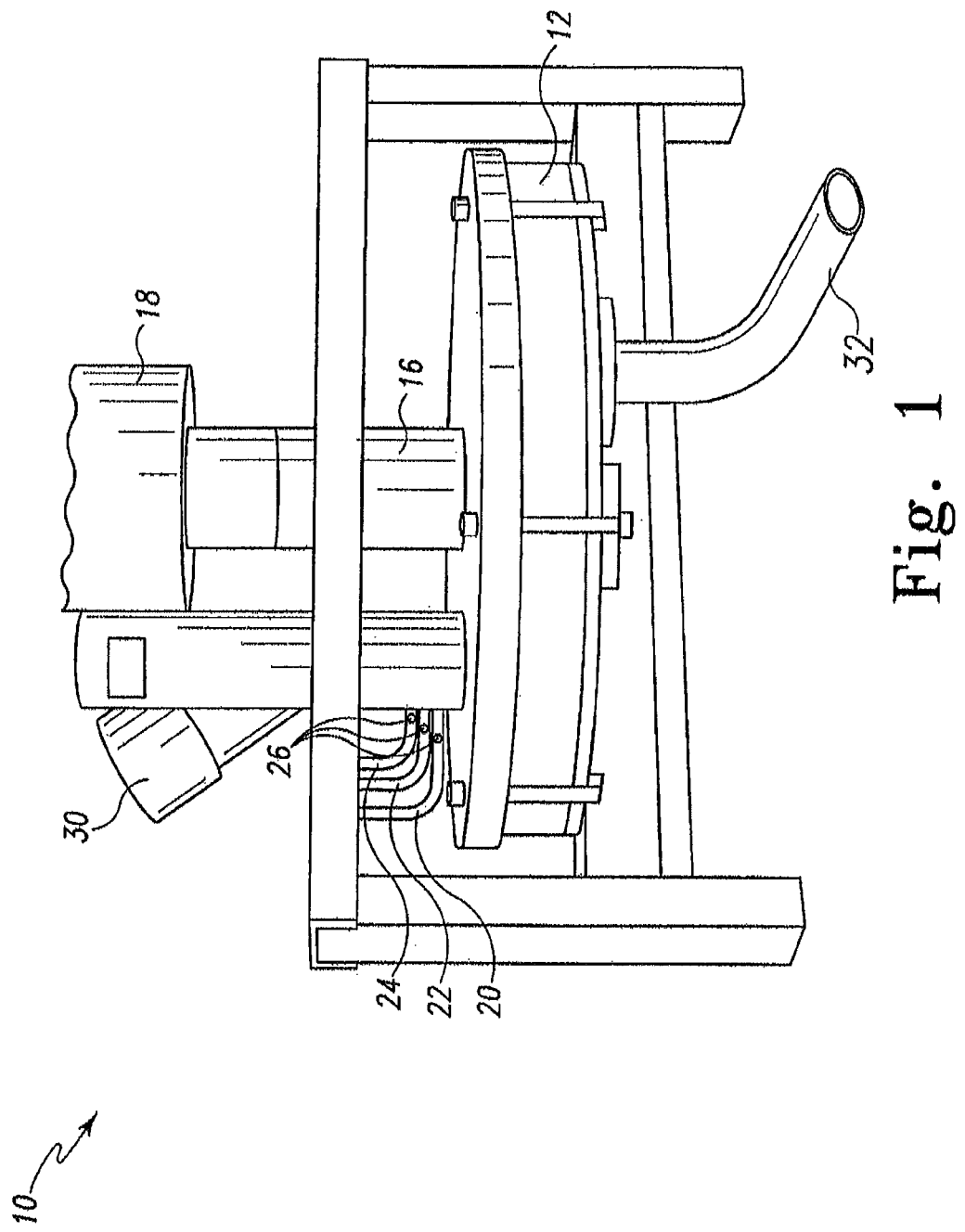
FIG. 1 is a front view of an exemplary pin mixer.

As discussed, a method for manufacturing gypsum wallboard includes premixing dry ingredients and a pulp paper solution in a mixing apparatus to create the gypsum slurry. FIG. 1 shows a front perspective view of an exemplary pin mixer 10 that can be used to mix the dry ingredients with the pulp paper solution to produce the stucco slurry. As shown in FIG. 1, pin mixer 10 has a shell 12 that houses a plurality of pins (not shown). A motor 18 operates to turn a rotor 16 which in turn spins the pins in shell 12 to mix the ingredients. Pin mixer 10 also has a hopper 30 that allows for the dry ingredients to be deposited into pin mixer 10. Pulp waterline 20 for adding the pulp solution, gauging waterline 22 for adding additional water, and foam waterline 24 for adding foam are all connected to mixer 10 and allow for the pulp paper solution, water, and a foam solution to be added to the pin mixer and the gypsum slurry, respectively. Prior to being fed to the pin mixer through the foam waterline 24, the foam solution is created by any number of foam generation devices known in the art. Each of the waterlines 20, 22, and 24 can have an inlet 26 (or multiple inlets) that allows for other components to be added to the waterlines. Similarly, the foam generation device can be equipped with inlets that allow for components to be added directly to the foam solution as it is generated.

The slurry is deposited on a continuous moving bottom facing material (not shown) through slurry discharge 32, which can be a boot or other suitable conduit (e.g., flexible hosing or pipes). It will be appreciated that any number of facing materials can be used to create the gypsum wallboard, including but not limited to paper. Slurry discharge 32 can also have an inlet that allows for other ingredients to be added to the slurry as it passes through the slurry discharge 32. It will be appreciated that slurry discharge 32 can have any number of inlets that allow for the addition of such ingredients. While FIG. 1 shows an exemplary pin mixer used in a gypsum product manufacturing process, it will be appreciated that any number of suitable mixers exist for forming the slurry and that FIG. 1 is only provided for the sake of discussion.

Figure 2:
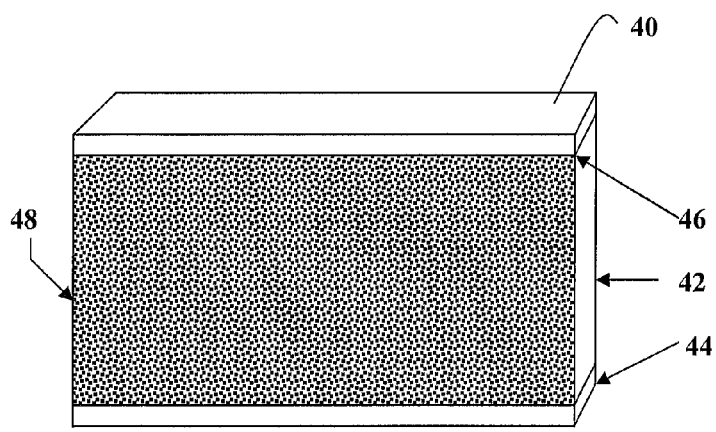
FIG. 2 is a cross-sectional side view of a gypsum wallboard with uncoalesced air voids.

FIG. 2 shows a cross-sectional, side view of a gypsum wallboard 40 that is produced using the ingredients and processes described herein. As shown in FIG. 2, gypsum wallboard comprises the gypsum core 42 sandwiched between two layers of facing material 44. During the rehydration process, calcium sulfate dihydrate crystals form. Wallboard gets its strength from the formation and the interlocking of these crystals of calcium sulfate dihydrate. At the paper core interface 46, these crystals of calcium sulfate dihydrate interlock with the fibers of the facing material 44 to form the paper to core bond. FIG. 2 shows a plurality of air pockets 48 in the gypsum core formed by the addition of aqueous foam to the slurry. As shown in FIG. 2, air pockets 48 decrease the surface area of the gypsum core 42 at the paper core interface. Thus, the presence of air pockets 48 at the paper core interface causes a decrease in the strength of the paper to core bond, because the air pockets 48 at the paper core interface prevent a uniform paper to core bond from forming. Also shown in FIG. 2, air pockets 48 and walls between them are randomly sized. This non-uniform structure leads to the wallboard having a decreased level of compressive strength.

Figure 3:
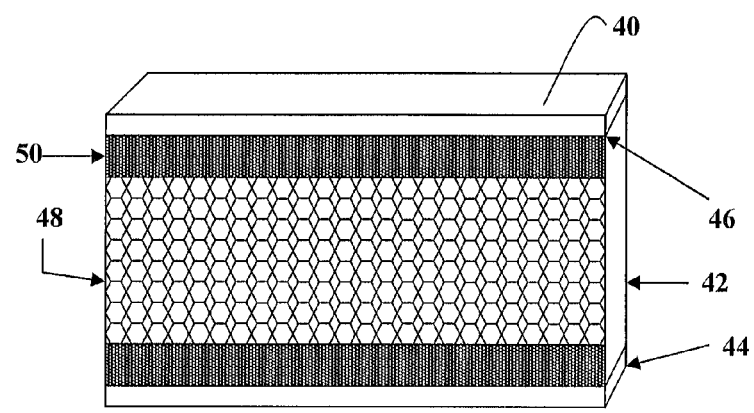
FIG. 3 is a cross-sectional side view of a gypsum wallboard with coalesced air voids.

The strength of the paper to core bond in gypsum board can be improved by including additives in the slurry that coalesce the foam cells in the slurry and the resulting air pockets in the gypsum core. By coalescing the foam cells/air pockets, the foam cell structure is more uniform and the resulting air pockets are located away from the paper core interface. The coalescing of the foam cells will increase the density and the surface area of the gypsum slurry at the paper core interface, which in turn will lead to a more uniform and stronger paper to core bond. FIG. 3 shows a cross-sectional, side view of a gypsum wallboard produced from a slurry with additives that coalesce the air voids. As shown in FIG. 3, such additives cause air pockets 48 to coalesce towards the center of the gypsum core creating a more dense layer 50 of the gypsum core at the paper core interfaces. This results in a higher contacting surface area at each of the paper core interfaces 46, which in turn results in a stronger paper to core bond and increases the compressive strength of the board. Moreover, the coalescing of the air pockets 48 leads to a more honeycomb structure where the air pockets are larger and more uniform in size. As a result, the walls between the air pockets are more uniform in size and the overall compressive strength of the wallboard is increased.

Suitable coalescing additives that can be added to the slurry in order to coalesce the foam cells/air pockets, include but are not limited to, polyamines and chemistries based upon polydimethylsiloxane with aminoalkyl and polyether groups (emulsions in water). Examples of suitable polyamines include, but are not limited to EP-R10P50 available from BASF Group, the Chemical Company. Examples of suitable chemistries based upon polydimethylsiloxane with aminoalkyl and polyether groups include EXP 2933 and EXP 2937 both available from Wacker Chemie Ag. Other suitable additives that destabilize the foam in a manner that causes the foam cells/air pockets to coalesce can be used. For example, any additive which changes the surface tension of the slurry or additives with high surface area can be used to cause coalescence of the foam cells in the slurry.

Such additives can be added to the slurry in a number of ways including, but not limited to, adding such additives into any water source that supplies water to the slurry. For example, such additives can be added through any of the conduits 26 into the gauging water line 22, the foam water line 24, and pulp water line 20 (shown in FIG. 1). In addition, such additives can be added through conduit 26 of slurry discharge 32 (shown in FIG. 1), as the slurry exits the pin mixer 10, or directly to the foam generation device as the foam is created. Such chemistries can be added at a controlled rate in order to further increase the effectiveness of the coalescing additive.

The resulting increase in the strength of the paper to core bond and the compressive strength of the board reduces the amount of natural polymers (e.g., starch) or other similar strengthening additives (e.g., SBR latex) needed to increase the strength of the board. By reducing the amount of natural polymer and other similar strengthening additives, a manufacturer can further reduce the cost of manufacturing gypsum wallboard because such additives are expensive.

The coalescing of the foam cells in the slurry using coalescing additives allows for a larger, more stable foam cell structure that is not dependent on soap chemistry. As previously mentioned, the effectiveness of using soap chemistries is largely dependent on the quality of water used to produce the foam, which varies from plant to plant. The use of coalescing additives to coalesce the foam cells can be used with foam produced from any appropriate soap with any quality of water.

The following examples are included to demonstrate some of the exemplary formulations and techniques that can be used to coalesce the foam cells by the addition of coalescing additives. However, those of ordinary skill in the art will appreciate that many changes can be made to the following sample slurry formulas and formulation techniques, while still obtaining a like or similar result without departing from the spirit and scope of this disclosure.

Sample Slurry Formulations

The humidified paper core bond integrity and compressive (nail-pull) strength of a series of wallboard samples were compared to demonstrate the improvements in the strength of wallboards produced using coalescing additives to coalesce the foam cells. The humidified paper core bond integrity is a measure of the percent of the facing material able to be peeled away from the core after being subjected to a high humidity environment (i.e., an environment with 90% humidity and a 90° F. temperature) for a set period of time. Table I shows the component formulation of the wallboard samples in mass percentages based on stucco. Enough of each component is added to produce dry boards with weights around 1400 and 1650 pounds per 1,000 square feet for a ½ inch thick wallboard or around 2200 and 2400 pounds per 1,000 square feet for ⅝ inch thick wallboard. It will be appreciated by one skilled in the art that while ½ and ⅝ inch thicknesses are used, these exemplary formulas can be used to produce wallboard of any thickness.

TABLE I

Formulation by Mass Percent Based on Stucco

| | Control | Samples |
|---|---|---|
| Stucco | 100% | 100% |
| Accelerator | 0.08%-0.60% | 0.08%-0.60% |
| Starch | .20%-.90% | .20%-.90% |
| Coalescing Additive | 0 | .011-.074% |
| Potash | .02%-.15% | .02%-.15% |
| Pulp Paper | .09%-.15% | .09%-.15% |
| Pulp Water | 5.0%-12.6% | 5.0%-12.6% |
| Gauging Water | 49%-68% | 49%-68% |
| Dispersant | .19%-.75% | .19%-.75% |
| 10% RA 77 Retarder | .01%-.02% | .01%-.02% |
| Soap | 0.03%-.12% | 0.03%-.12% |
| Foam Water | 7.5%-18.7% | 7.5%-18.7% |

As shown by these samples, the dosage range in these examples of the coalescent material to ½ and ⅝ inch thick boards range from 0 to about 0.074 mass % based on stucco, with greater increases in strength being found at ranges from about 0.011 to about 0.022 mass % based on stucco for ½ inch thick boards. In addition to the stucco, starch, pulp paper, pulp water and potash being added to the stucco slurry composition, the slurry composition contains an accelerator, such as BMA (produced by National Gypsum Company), a retarder, such as, Proteinaceious Retarder (produced by National Gypsum Company), Accumer (produced by Rohm & Haas), and RA-77 (produced by Rhodia), and a dispersant, such as Diloflow (produced by Geo Chemicals), Gypflow (produced by Handy Chemicals) and Daxad (produced by Geo Chemicals). The foam solution used in the creation of these exemplary slurry formations had a weight of 5-15 lbs/cubic feet.

Both ½ inch and ⅝ inch thick boards were produced from the above formulas and tested to determine the increase in compressive strength (nail pull strength) and the increase in strength of the paper to core bond (percent of bond failure). Three sets of three ⅝ inch thick board specimens were prepared with 0.010, 0.017 and 0.019 mass % based on stucco of coalescing additive by formula mass, respectively. These ⅝ inch thick board specimens were compared to a baseline sample that contained 0 mass % based on stucco coalescing additive in order to determine the decrease in failure of the specimens face paper to core bond and back paper to core bond. Two sets of three ½ inch thick board specimens on separate days were prepared with 0.011 and 0.013 mass % based on stucco coalescing additive, respectively. Each of the ⅝ inch thick board samples and the ½ inch thick board samples were created by adding the coalescing additive to the slurry as the slurry passed through the slurry discharge (e.g., the boot). These ½ inch thick board specimens were compared to baseline samples that contained 0 mass % based on stucco coalescing additive in order to determine the decrease in failure of the specimens face paper to core bond and back paper to core bond and the increase of compressive strength of the board samples containing coalescing additives. Table II shows the percentage of paper to core bond failure for each of these samples and Table III shows the percent increase of nail pull strength of these samples with the coalescing additive.

TABLE II

20-Hour Humidified Paper to Core Bond Percent Failure

| Thickness (inches) | Coalescing Additive Mass % | Back % Peel | Front % Peel |
|---|---|---|---|
| ⅝ | 0 | 8.0 | .5 |
| ⅝ | .010 | 1.0 | .3 |
| ⅝ | .017 | 1.6 | .5 |
| ⅝ | .019 | 1.0 | 2.6 |
| ½ | 0 | 40.9 | 22.5 |
| ½ | 0 | 52.8 | 19.5 |
| ½ | 0* | 63.13 | 1.3 |
| ½ | .011 | 1.2 | 0 |
| ½ | .013 | .7 | 2.6 |
| ½ | .011* | .7 | 0 |
| ½ | .013* | 0 | .3 |

*Samples created on different day

TABLE III

Percent Increase of Compressive Strength (Nail Pull Test)

| Thickness (inches) | Coalescing Additive Mass % | % Increase |
|---|---|---|
| ⅝ | .010 | 6.1 |
| ⅝ | .017 | 7.0 |
| ⅝ | .019 | 9.8 |
| ½ | .011 | 8.7 |
| ½ | .013 | 7.1 |
| ½ | .011* | 10.4 |
| ½ | .013* | 11.6 |

*Samples created on different day

As shown by Table II, the percent of paper to core bond failure is substantially reduced for wallboards that contain a coalescing additive, as compared to wallboard samples that do not. Similarly, the compressive strength of the wallboard samples containing the coalescing additive is improved for ⅝ inch thick test board samples and the ½ inch thick test board samples.

Coalescing additives can be added to the slurry in a number of controlled load rates through the boot in the range of about 0.15 to about 0.5 pounds per 1,000 square feet for both ½ inch thick and ⅝ inch thick wallboard. For example, when a coalescing additive was added at 0.5 pounds per 1,000 square feet for a ½ inch thick wallboard, the nail pull strength improved by 10 lbs, while the humidified bond failure for the face facing material to the core was reduced by over 70% and the humidified bond failure for the back facing material to the core was reduced by 40%. When the load rate of the additive was reduced to 0.15-0.18 pounds per 1,000 square feet for a ½ inch thick wallboard, the compressive strength of the board was increased over 10%. When the load rate of the additive was set at 0.35 pounds per 1,000 square feet for a ⅝ inch thick wallboard, the compressive strength for the created sample was increased by over 9%. When the load rate of the additive was set at 0.3 pounds per 1,000 square feet for a ⅝ inch thick wallboard, the compressive strength of the created sample was increased around 7% and when the load rate of the additive was set at 0.18 pounds per 1,000 square feet for a ⅝ inch board the compressive strength of the created sample was increased over 6%.

While methods of manufacturing wallboard and the resulting wallboard have been described in detail with reference to certain exemplary embodiments thereof, such are offered by way of non-limiting examples, as other versions are possible. For example, it is anticipated that a variety of other modifications and changes will be apparent to those having ordinary skill in the art and that such modifications and changes are intended to be encompassed within the spirit and scope of the invention as defined by the following and any later added claims.

Further, in describing representative embodiments, the disclosure may have presented a method and/or process as a particular sequence of steps. However, to the extent that the methods or processes do not rely on the particular order of steps set forth herein, the methods or processes should not be limited to the particular sequence of steps described. As one of ordinary skill in the art would appreciate, other sequences of steps may be possible. Therefore, the particular order of the steps disclosed herein should not be construed as limitations on the claims. In addition, the claims directed to a method and/or process should not be limited to the performance of their steps in the order written, and one skilled in the art can readily appreciate that the sequences may be varied and still remain within the spirit and scope of this disclosure.

We claim:

1. A method of manufacturing gypsum wallboard, the method comprising the steps of:
   providing a slurry including stucco, paper pulp and water;
   generating an aqueous foam of foam cells comprising a soap, water and air;
   adding the aqueous foam to the slurry;
   adding a coalescing additive to the slurry to coalesce the foam cells, the coalescing additive comprising a polydimethylsiloxane with aminoalkyl and polyether groups emulsion; and
   depositing the slurry on a facing material to form a gypsum board.

2. The method of claim 1 wherein the step of adding a coalescing additive to the slurry comprises adding the coalescing additive to a water source that supplies water to the slurry, so that the coalescing additive is added to the slurry when the water is added to the slurry.

3. The method of claim 2 wherein the water source comprises a gauging water line.

4. The method of claim 2 wherein the water source comprises a pulp water line.

5. The method of claim 2 wherein the water source comprises a foam water line.

6. The method of claim 1 wherein the slurry passes through a slurry discharge to be deposited on the facing material and the coalescing additive is added to the slurry as the slurry passes through the slurry discharge.

7. The method of claim 1 wherein the coalescing additive is added to the slurry at a controlled rate.

8. The method of claim 7 wherein the coalescing additive is added to the slurry at the controlled rate of about 0.15 to about 0.5 pounds per 1,000 square feet of slurry.

9. The method of claim 7 wherein the coalescing additive is added to the slurry at the controlled rate of about 0.15 to about 0.18 pounds per 1,000 square feet of slurry used to produce a ½ inch thick gypsum board.

10. The method of claim 7 wherein the coalescing additive is added to the slurry at the controlled rate of about 0.18 to about 0.35 pounds per 1,000 square feet of slurry used to produce a ⅝ inch thick wallboard.

11. A gypsum wallboard produced by mixing a slurry including stucco, paper pulp, water, and an aqueous foam of foam cells comprising a soap, water and air, adding coalescing additive to the slurry separate from the aqueous foam to coalesce the foam cells, the coalescing additive comprising a polydimethylsiloxane with aminoalkyl and polyether groups emulsion, depositing the slurry on at least one paper facing material to form a gypsum board, cutting the gypsum board to the desired size, and drying the gypsum board.

12. The gypsum wallboard of claim 11 wherein the slurry is deposited in between a first and second paper facing material to form the gypsum board.

13. A gypsum wallboard comprising:
    at least one facing material;
    a gypsum core bonded to the at least one facing material at an interface between the facing material and the gypsum core, the gypsum core formed from a composition comprising:
        a slurry including stucco, paper pulp and water;
        an aqueous foam of foam cells comprising a soap, water and air; and
        a coalescing additive that coalesces the foam cells, the coalescing additive comprising a polydimethylsiloxane with aminoalkyl and polyether groups emulsion; and
    the gypsum core has a structure comprising foam cells that are coalesced away from the interface and the density of the gypsum core at the interface is greater than the density of the gypsum core farther away from the interface.

14. The gypsum wallboard of claim 13 wherein the gypsum core is sandwiched between first and second facing materials, the gypsum core respectively bonded to the first and second facing materials at first and second interfaces between the gypsum core and the first and second facing materials, and the gypsum core has a structure wherein the foam cells are coalesced away from the first and second interfaces.

15. The method of claim 1, wherein the coalescing additive is added at the controlled rate of between about 0.15 pounds to about 0.5 pounds per 1000 manufacturing square feet of wallboard having a thickness from about ½ inch to ⅝ inch.

16. The gypsum wallboard of claim 11, wherein the additive is added to the slurry at the controlled rate of between about 0.15 pounds to about 0.5 pounds per 1000 manufacturing square feet of wallboard having a thickness from about ½ inch to ⅝ inch.

17. The gypsum wallboard of claim 13, wherein the coalescing additive is in an amount of between about 0.15 pounds to about 0.5 pounds per 1000 manufacturing square feet of wallboard having a thickness from about ½ inch to ⅝ inch.

* * * * *